(12) United States Patent
Tada

(10) Patent No.: US 10,023,083 B1
(45) Date of Patent: Jul. 17, 2018

(54) SEAT MOUNTING STRUCTURE

(71) Applicant: KUBOTA CORPORATION, Osaka (JP)

(72) Inventor: Hiroyuki Tada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/490,140

(22) Filed: Apr. 18, 2017

(51) Int. Cl.
*A47B 97/00* (2006.01)
*B60N 2/54* (2006.01)
*B60N 2/10* (2006.01)
*B60N 2/38* (2006.01)
*B60N 2/50* (2006.01)

(52) U.S. Cl.
CPC ............... *B60N 2/544* (2013.01); *B60N 2/10* (2013.01); *B60N 2/38* (2013.01); *B60N 2/502* (2013.01)

(58) Field of Classification Search
CPC .......... B60N 2/544; B60N 2/502; B60N 2/10; B60N 2/38
USPC ........... 248/503.1, 424, 429, 430; 296/65.01, 296/65.11, 65.05, 65.15; 297/331
See application file for complete search history.

(56) References Cited

U.S. PATENT DOCUMENTS

| 5,284,115 | A | * | 2/1994 | Imanishi | ................ | B60K 11/00 |
| | | | | | | 123/198 E |
| 7,273,254 | B2 | * | 9/2007 | Fujita | .................... | B60N 2/3013 |
| | | | | | | 297/331 |
| 9,487,149 | B2 | * | 11/2016 | Shimada | ................. | B60R 7/043 |

* cited by examiner

*Primary Examiner* — Todd M Epps
(74) *Attorney, Agent, or Firm* — Greenblum & Bernstein, P.L.C.

(57) ABSTRACT

A seat mounting structure for mounting a seat to a work vehicle includes a seat base fixed to a vehicle body, a seat swing element fixed to the seat and attached to the seat base to be vertically swingable, a suspension unit arranged between the seat base and the seat swing element, and a lock lever attached to the seat swing element to be movable between a seat locking position to prevent the seat swing element from flipping over and a seat unlocking position to allow the seat swinging element to swing upward. The lock lever engages the suspension unit in the seat locking position and disengages from the suspension unit in the seat unlocking position.

7 Claims, 8 Drawing Sheets

US 10,023,083 B1

SEAT MOUNTING STRUCTURE

TECHNICAL FILED OF INVENTION

This disclosure relates to a structure for mounting a seat to a work vehicle.

BACKGROUND

A work vehicle includes various devices such as engine accessories and a fuel tank in a rear or lower region of a seat. The seat can change its position to inspect these devices. U.S. Pat. No. 5,284,115 discloses an example of the work vehicle including a seat attached to a seat base mounted on a fender deck provided between front wheels and rear wheels. The work vehicle includes brackets arranged forward of the seat, and a transverse shaft extending transversely through the brackets. The seat is vertically swingable via the transverse shaft. The vehicle further includes two springs arranged rearward of the seat base to support a rear part of the seat in a cushioning manner. The seat base is provided with a toolbox covered with the seat.

The seat disclosed in U.S. Pat. No. 5,284,115 maintains a seating position by the weight of the operator and swings upward by the action of the springs as the operator leaves the seat. The unoccupied seat freely swings upward and thus easily flips over. While such an arrangement is advantageous to access the toolbox, the seat disadvantageously easily turns over when an unexpected force, such as blowing wind, is applied to the seat during parking, for example. If the seat remains turned over, rain or any foreign matters might enter the toolbox.

SUMMARY OF INVENTION

Under the circumstances, there has been a demand for a seat mounting structure capable of restricting upward swing movement of a seat relative to a seat base while providing a suspension function.

A seat mounting structure for mounting a seat to a work vehicle disclosed herein includes a seat base fixed to a vehicle body, a seat swing element fixed to the seat and attached to the seat base to be vertically swingable, a suspension unit arranged between the seat base and the seat swing element, and a lock lever attached to the seat swing element to be movable between a seat locking position to prevent the seat swing element from flipping over and a seat unlocking position to allow the seat swinging element to swing upward. The lock lever engages the suspension unit in the seat locking position and disengages from the suspension unit in the seat unlocking position.

With this arrangement, as the operator shifts the lock lever to the seat locking position when seated, the lock lever engages the suspension unit to restrict upward swing movement of the seat swing element (seat) and thus prevent the seat from flipping over after the operator leaves the seat. Conversely, as the operator shifts the lock lever to the seat unlocking position, the lock lever disengages from the suspension unit to allow the upward swing movement of the swing element (seat) and thus allow the seat to flip over. The lock lever engages the suspension unit, preferably one of the components forming the suspension unit, disposed between the seat swing element and the seat base, which simplifies the locking structure for preventing turnover of the seat and requires only a small space for the locking structure.

DETAILED DESCRIPTION OF INVENTION

Next, an embodiment of a work vehicle disclosed herein will be described in detail in reference to the accompanying drawings.

Figure 1:
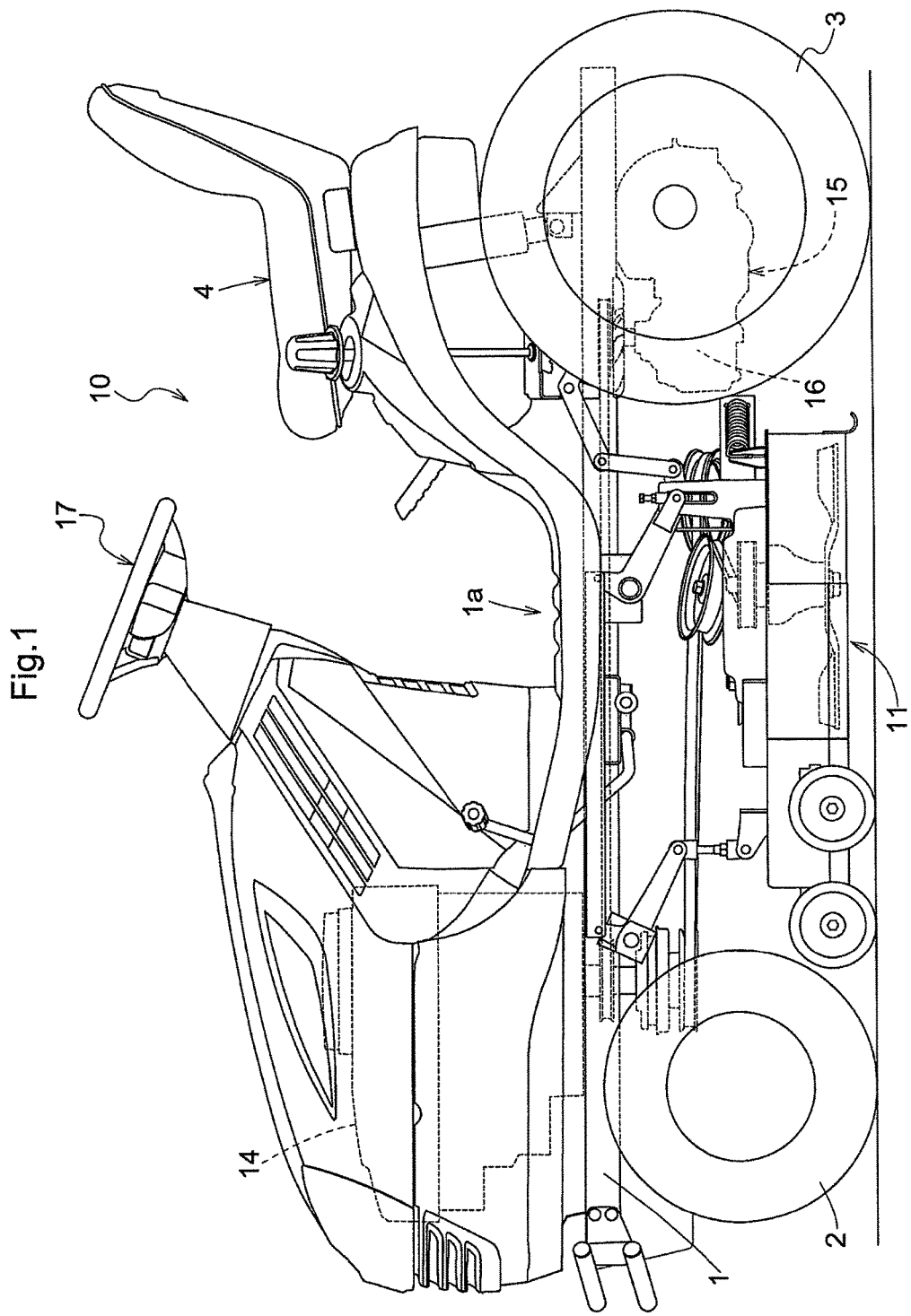
FIG. 1 is a side view of a lawn mower as an example of a work vehicle.

The work vehicle represents a lawn mower mounted on a tractor. Referring to FIG. 1, the lawn mower includes a vehicle body 1 having a frame structure, a pair of right and left steerable front wheels 2, a pair of right and left driven rear wheels 3 which are rotated and driven independently of each other, a mower unit 11 suspended from the vehicle body 1 through a linkage between the front wheels 2 and the rear wheels 3, an operator's section 10 mounted in an intermediate region of the vehicle body 1 in a vehicle front-rear direction, a seat assembly 4 mounted in the operator's section 10 and placed on a floor panel 1a forming the vehicle body 1 with the frame structure, and an engine 14, which is a diesel engine or gasoline engine, mounted on a front region of the vehicle body 1. The vehicle body 1 is supported to the ground by the front wheels 2 and the rear wheels 3.

The lawn mower further includes a transmission 15 mounted in a rear region of the vehicle body 1 for receiving engine power from an engine output shaft via a belt transmission device. The transmission 15 includes a hydrostatic transmission ("HST" hereinafter) 16 for continuously varying the engine power between a lower speed and a higher speed in a forward-drive state or a reverse-drive state to transmit the power to the right and left rear wheels 3.

Shifting operations for the HST are performed through an unillustrated shift pedal.

The right and left front wheels 2 are driven through a steering wheel 17.

Figure 2:
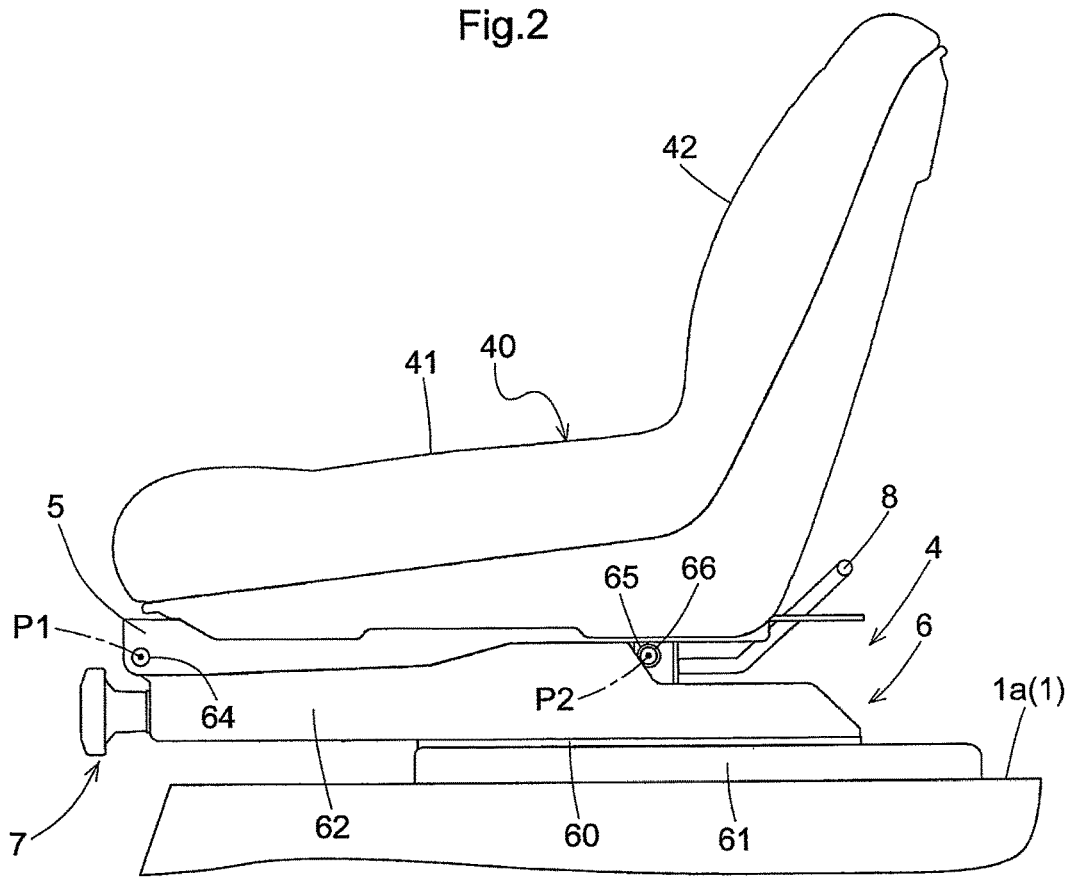
FIG. 2 is a side view of a seat mounting structure with a seat in a seating position.
Figure 3:
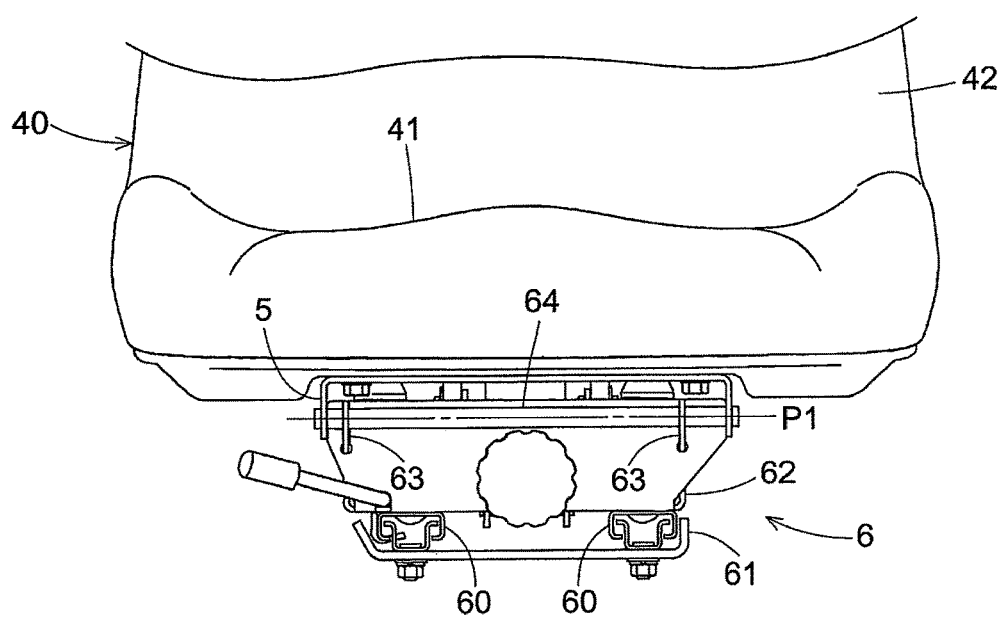
FIG. 3 is a front view of the seat mounting structure with the seat in the seating position.

Referring now to FIGS. 2 and 3, the seat assembly 4 includes a seat 40, a seat swing member formed as a seat swing plate 5 in this embodiment, a seat base 6, a suspension unit 7 (FIG. 4) provided between the seat swing plate 5 and the seat base 6, and a lock lever 8. The seat 4 is formed of a seat cushion 41 and a backrest 42. The seat swing plate 5 is fixed to a bottom surface of the seat cushion 41.

Figure 4:
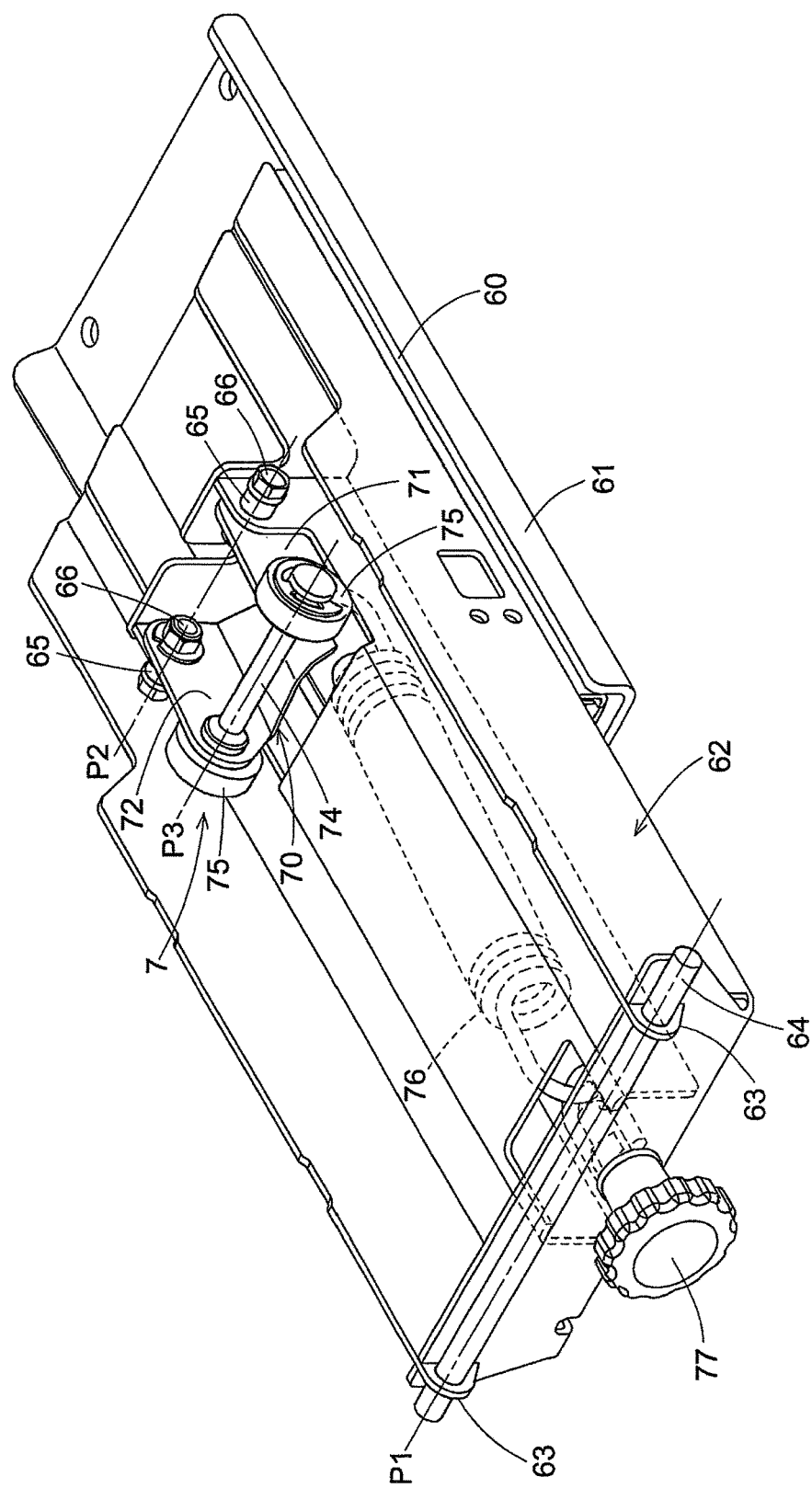
FIG. 4 is a perspective view of the seat mounting structure.
Figure 5:
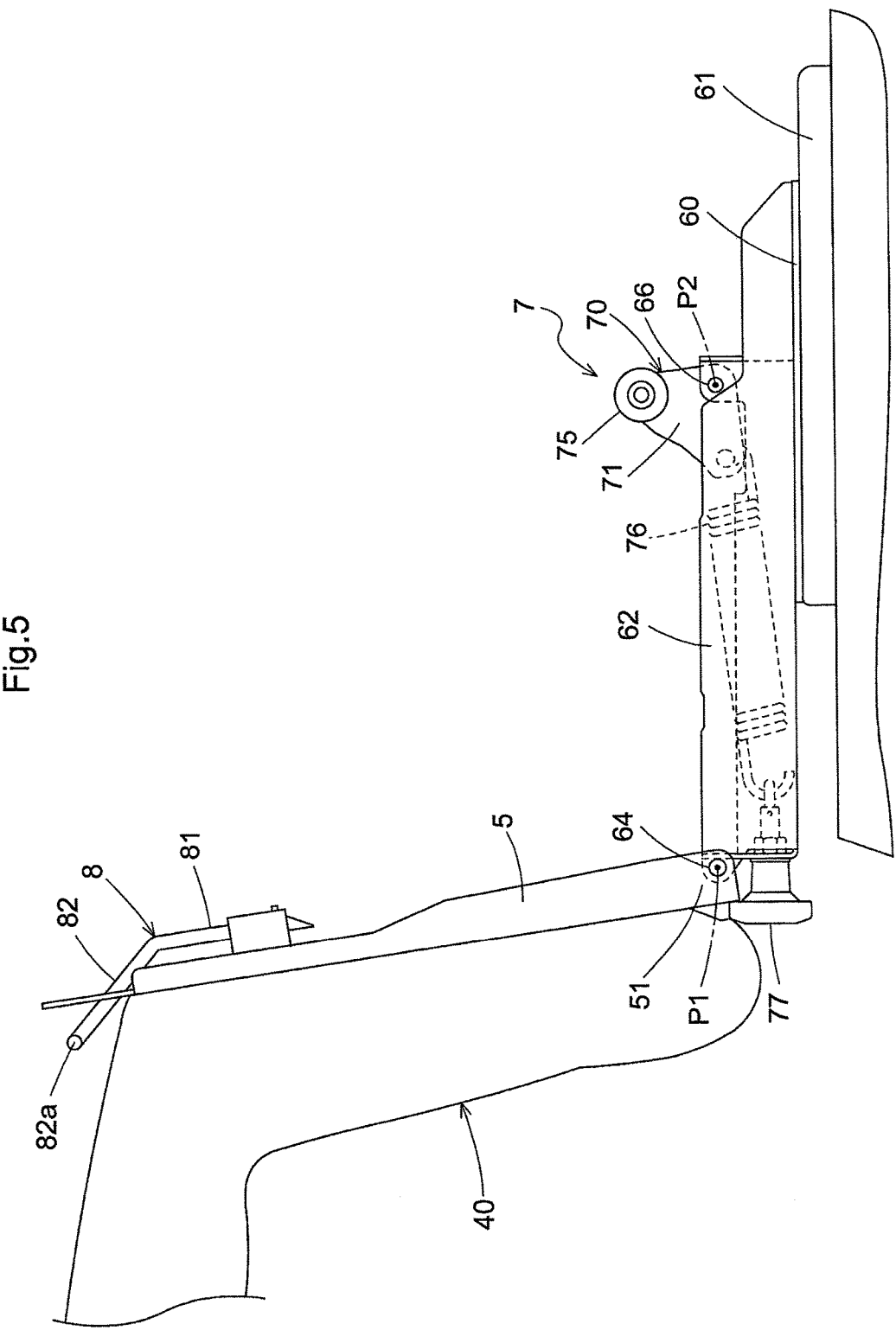
FIG. 5 is a side view of the seat mounting structure with the seat in a flip-over position.

As understood from FIGS. 3 to 5, the seat base 6 is formed of a first base 61 fixed to the floor panel 1a, and a second base 62 placed on the first base 61 via a rail unit 60. As well known, the rail unit 60 adjusts a position of the first base 61 and eventually a position of the seat 40 in the vehicle front-rear direction. The second base 62 has a pair of right and left first boss portions 63 formed at a front part thereof and having a first axis P1 extending in a vehicle transverse direction. A first shaft 64 acting as a pivotal shaft for the seat swing plate 5 is inserted into the first boss portions 63. The second base 62 has a pair of right and left second boss portions 65 at a rear part thereof and having a second axis P2 extending in the vehicle transverse direction. A second shaft 66 is inserted into each one of the second boss portions 65.

Referring to FIG. 5, the seat swing plate 5 has seat boss portions 51 at a front end thereof. The first shaft 64 is inserted into the seat boss portions 51. More particularly, the seat swing plate 5 is supported by the second base 62 to be pivotable about the first axis P1 via the first shaft 64. Such an arrangement allows the seat swing plate 5 and thus the seat 40 to be pivotable from a seating position (FIG. 2) to a flip-over position (FIG. 5).

Figure 6:
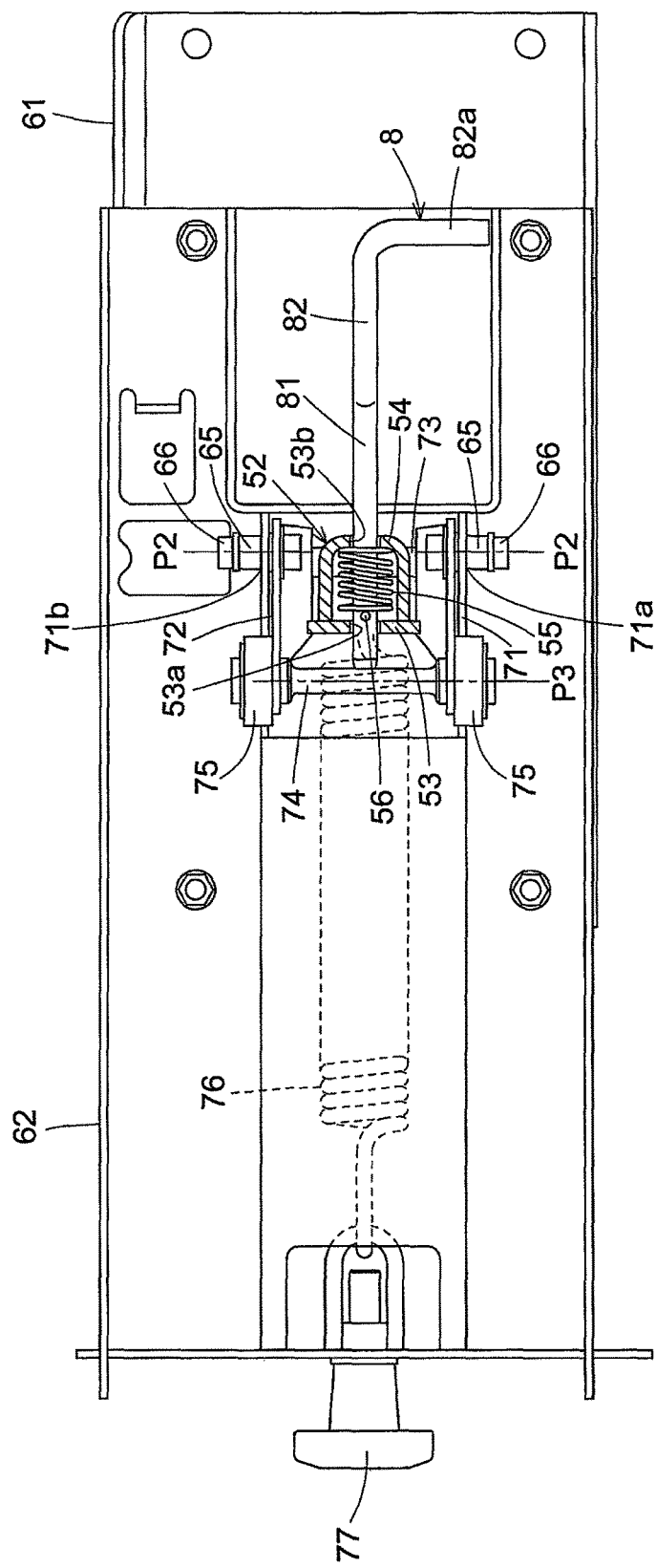
FIG. 6 is a top plan view of the seat mounting structure.
Figure 7:
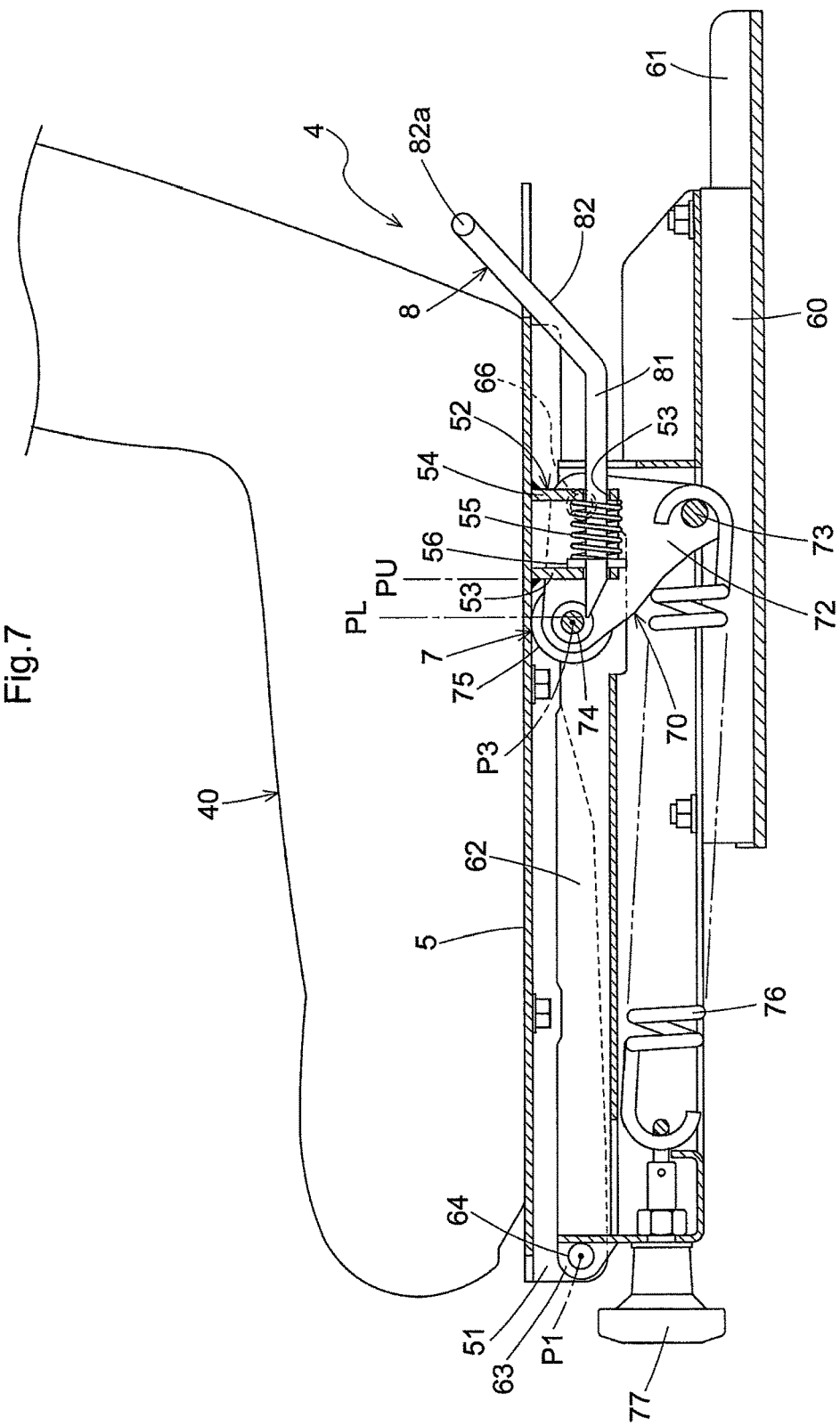
FIG. 7 is a vertical sectional view of the seat mounting structure in a seat locking position.
Figure 8:
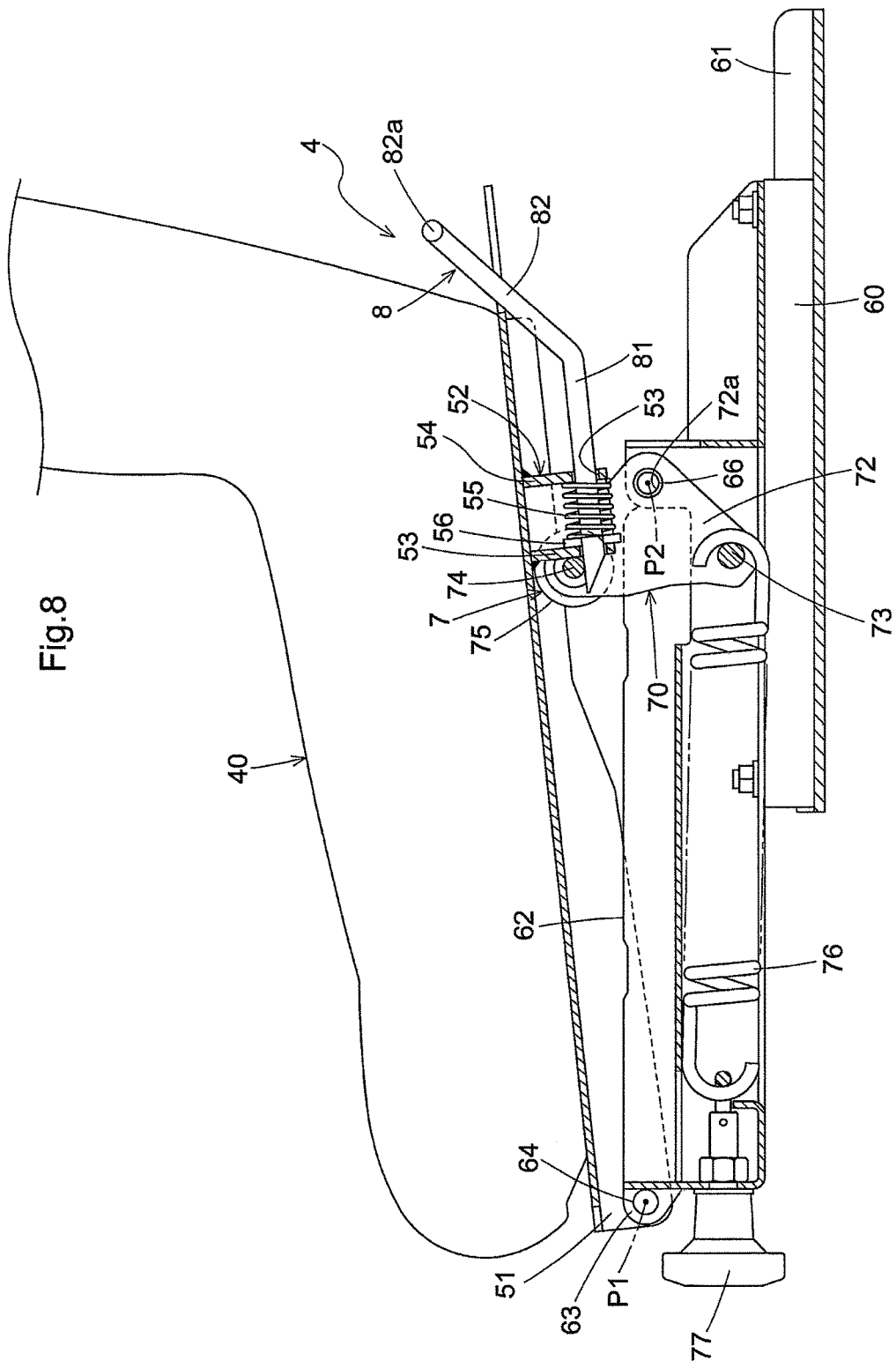
FIG. 8 is a vertical sectional view of the seat mounting structure with the seat being inhibited from swinging.

Referring to FIGS. 6 to 8, the lock lever 8 is positioned under a bottom surface of the seat swing plate 5 to be slidable in the vehicle front-rear direction. The lock lever 8 is a bent rod having a straight part 81 extending horizontally between the second base 62 and the seat swing plate 5, an extension part 82 extending upward from the straight part 81 beyond the seat swing plate 5 and bent at an intermediate part in the vehicle transverse direction to form a grip 82a. A cylindrical guide bracket 52 is attached to the bottom surface of the seat swing plate 5 to extend downward. The guide bracket 52 has a front wall 53 forming a guide bore 53a and a rear wall 54 forming a guide bore 53b aligned coaxially with the guide bore 53a in the vehicle front-rear direction. The straight part 81 of the lock lever 8 extends through the guide bores 53a and 53b. This arrangement allows the lock lever 8 to slide between a seat locking position ("PL" in FIG. 7) defined forward of the vehicle body and a seat unlocking position ("PU" in FIG. 7) defined rearward of the vehicle body. A lock spring 55 is provided within the guide bracket 52 to fit on the straight part 81 of the lock lever 8, having a front end coming into contact with a spring receiving pin 56 fixed to the lock lever 8. More particularly, the lock lever 8 is urged to a seat locking direction by the action of the lock spring 55. With this arrangement, if the operator holds the grip 82a and pulls the locker lever 8 to the seat unlocking position, the lock lever 8 returns to the seat locking position when the operator releases the lever.

Figure 9:
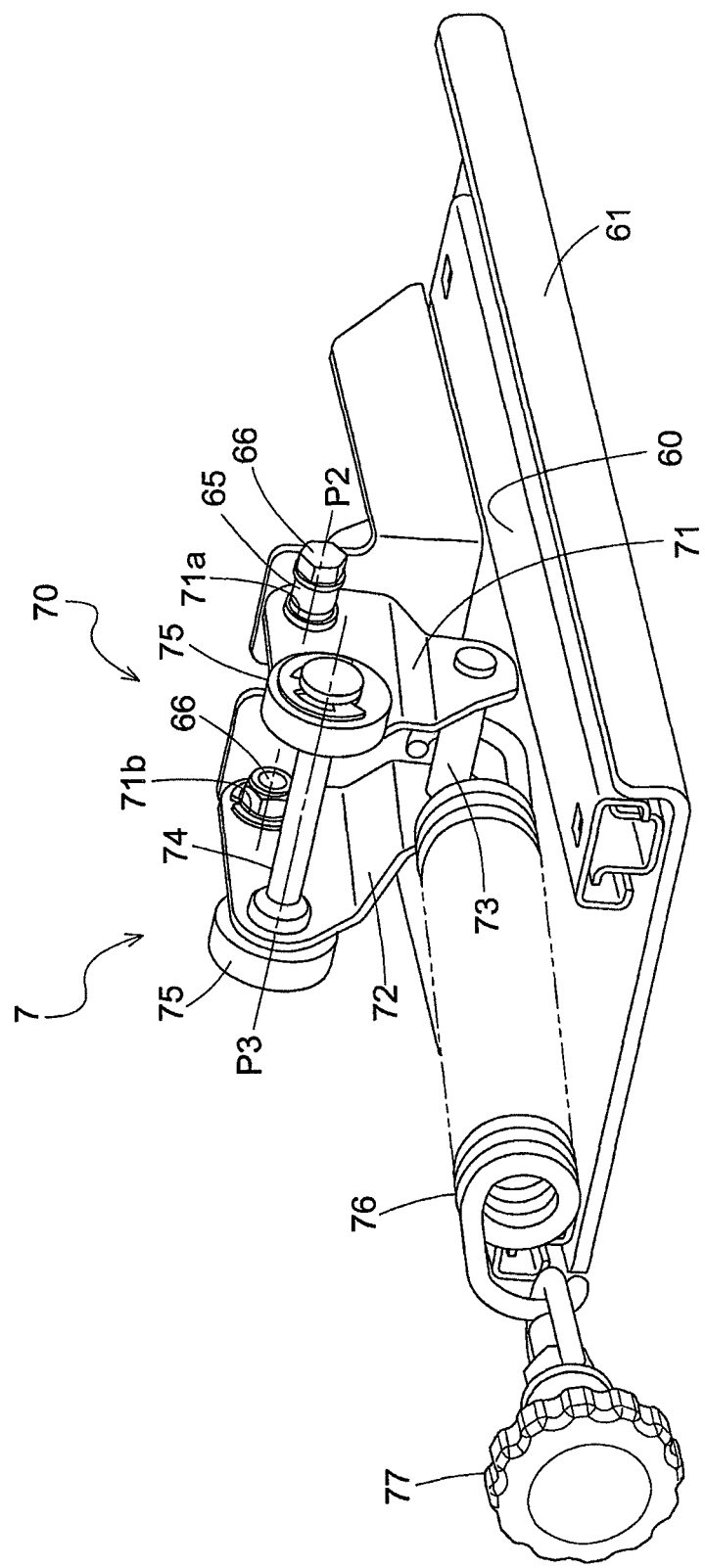
FIG. 9 is a perspective view of a seat base.

As understood from FIGS. 7 and 8, the suspension unit 7 is arranged between the seat swing plate 5 and the seat base 6. Referring to FIGS. 6 and 9, the suspension unit 7 includes a bracket element 70 acting as a suspension arm pivotable about the second axis P2. The bracket element 70 has an inversed-triangular left side plate 71, an inversed-triangular right side plate 72, and a connecting rod 73 connecting a lower end of the left side plate 71 to a lower end of the right side plate 72. Further, a roller shaft 74 having an axis P3 extends to connect an upper front end of the left side plate 71 and an upper front end of the right side plate 72. A roller 75 is provided in a portion of the roller shaft 74 protruding outward from each one of the left side plate 71 and the right side plate 72. As understood from FIG. 9, the left side plate 71 and the right side plate 72 have a boss bore 71a and a boss bore 72a, respectively, at upper rear ends thereof, sharing the transversely extending second axis P2. As shown in FIGS. 4 and 6, the second shaft 66 supported by each one of the pair of second boss portions 65 of the second base 62 is inserted into each one of the boss bore 71a and the boss bore 72a. This arrangement allows the bracket element 70 to be vertically pivotable about the second axis P2.

A suspension spring 76 extends in the vehicle front-rear direction between the second base 62 and the seat swing plate 5, having one end attached to the connecting rod 73 and the other end fixedly screwed to a front end of the second base 62 via an adjustment dial 77. As a result, the suspension spring 76 functions to push up the seat swing plate 5. The suspension spring 76 is an example of an urging element for urging the bracket element 70 acting as the suspension arm to pivot upward. The adjustment dial 77 is rotated to adjust a preload on the suspension spring 76. When the bracket element 70 is pivoted upward by an urging force of the suspension spring 76, the rollers 75 are brought into contact with the bottom surface of the seat swing plate 5. The rollers 75 are an example of a receiving element mounted on the bracket element 70 (suspension arm) for receiving the seat swing plate 5 swinging downward.

As understood from FIGS. 7 and 8, while the seat 4 is swung counterclockwise about the first axis P1 when the operator leaves the seat 4, the bracket element 70 is pivoted clockwise. Here, an extreme end of the lock lever 8 in the seat locking position enters under the roller shaft 74 of the roller shaft 74 of the suspension arm to engage the roller shaft 74 (FIG. 8). This arrangement prevents upward swing movement of the seat swing plate 5 and thus turnover of the seat 40. On the other hand, in the seat unlocking position for the lock lever 8, the extreme end of the lock lever 8 is disengaged from under the roller shaft 74. Thus, while the lock lever 8 prevents upward swing movement of the seat swing plate 5 through engagement between the roller shaft 74 and the extreme end of the lock lever 8 in the seat locking position, the lock lever 8 allows upward swing movement of the seat swing plate 5 through disengagement between the roller shaft 74 and the extreme end of the lock lever 8 in the seat unlocking position.

The shapes of the components forming the seat assembly 4 including the seat 40, seat swing plate 5, seat base 6, suspension unit 7, and lock lever 8 may be altered in various ways.

The work vehicle disclosed herein is not limited to lawn mowers but is applicable to any agricultural vehicles such as tractors or combine harvesters and any construction work vehicles.

What is claimed is:

1. A seat mounting structure for mounting a seat to a work vehicle, the structure comprising:
    a seat base fixed to a vehicle body;
    a seat swing element fixed to the seat and attached to the seat base to be vertically swingable;
    a suspension unit arranged between the seat base and the seat swing element, and further comprising an urging element which urges the seat base upward; and
    a lock lever attached to the seat swing element to be movable between a seat locking position to prevent the seat swing element from flipping over and a seat unlocking position to allow the seat swinging element to swing upward, wherein the lock lever engages the suspension unit in the seat locking position and disengages from the suspension unit in the seat unlocking position.

2. The structure according to claim 1, wherein the lock lever is urged to the seat locking position.

3. The structure according to claim 1, wherein the suspension unit includes a suspension arm attached to the seat base to be vertically pivotable, the urging element which urges the suspension arm to pivot upward, and a receiving element provided in the suspension arm and receiving the seat swing element swinging downward.

4. The structure according to claim 3, wherein the receiving element includes a plurality of rollers, and a roller shaft extending between the plurality of rollers, wherein the lock lever engages the roller shaft in the seat unlocking position.

5. The structure according to claim 3, wherein the urging element comprises a suspension spring extending between the seat base and the seat swing element.

6. The structure according to claim 5, further comprising an urging-force adjustment element which adjusts an urging force of the suspension spring.

7. The structure according to claim 1, wherein the lock lever has an extension part extending upward from a position between the seat base and the seat swing element beyond the seat swing element, and a grip formed in the extension part.

\* \* \* \* \*